United States Patent
Stretton et al.

(10) Patent No.: US 11,156,167 B2
(45) Date of Patent: Oct. 26, 2021

(54) CASING

(71) Applicant: ROLLS-ROYCE plc, London (GB)

(72) Inventors: Richard G. Stretton, Ashby-de-la-Zouch (GB); Tim O'Hanrahan, Bristol (GB)

(73) Assignee: ROLLS-ROYCE PLC, London (GB)

(*) Notice: Subject to any disclaimer, the term of this patent is extended or adjusted under 35 U.S.C. 154(b) by 0 days.

(21) Appl. No.: 16/351,841

(22) Filed: Mar. 13, 2019

(65) Prior Publication Data
US 2019/0309688 A1    Oct. 10, 2019

(30) Foreign Application Priority Data
Apr. 6, 2018 (GB) ................................. 1805764

(51) Int. Cl.
| | | |
|---|---|---|
| *F02C 7/36* | (2006.01) | |
| *F02C 3/06* | (2006.01) | |
| *F02C 3/107* | (2006.01) | |
| *F02K 3/06* | (2006.01) | |

(52) U.S. Cl.
CPC ............... *F02C 7/36* (2013.01); *F02C 3/06* (2013.01); *F02C 3/107* (2013.01); *F02K 3/06* (2013.01); *F05D 2240/14* (2013.01); *F05D 2260/40311* (2013.01)

(58) Field of Classification Search
CPC .... F01D 25/24; F02K 3/06; F02C 7/36; F02C 3/06
See application file for complete search history.

(56) References Cited

U.S. PATENT DOCUMENTS

| | | |
|---|---|---|
| 4,471,609 A | 9/1984 | Porter et al. |
| 5,174,525 A | 12/1992 | Schilling |
| 5,385,013 A | 1/1995 | Barron et al. |
| 5,452,575 A | 9/1995 | Freid |
| 9,562,477 B2 * | 2/2017 | Beier ................... F02C 7/20 |
| 2011/0001002 A1 | 1/2011 | Chouard et al. |
| 2011/0146230 A1 | 6/2011 | LaChapelle et al. |

(Continued)

FOREIGN PATENT DOCUMENTS

| | | |
|---|---|---|
| EP | 0784564 A1 | 7/1997 |
| WO | WO 96/18538 | 6/1996 |

OTHER PUBLICATIONS

Great Britain Search Report, issued in GB Application No. GB1805764.6, dated Apr. 2, 2019, pp. 1-3, Great Britain Intellectual Property Office, South Wales, UK.

(Continued)

*Primary Examiner* — Michael L Sehn
(74) *Attorney, Agent, or Firm* — Brinks Gilson & Lione (57) ABSTRACT

A gas turbine engine comprising a planetary gear train, and a core engine casing. The gear train has a ratio of greater than approximately 3.0, with an input to the gear train being operatively connected to the compressor section, and an output from the gear train being operatively connected to the fan. The core engine casing encloses the compressor section and the turbine section.

The fan has a diameter F, and the core engine casing has a diameter C. The core engine casing diameter C varies along an axial length of the core engine casing, and a ratio (C/F) of the core engine casing diameter C to the fan diameter F is within the range $0.2<(C/F)<0.4$, along an axial length of the core engine casing.

9 Claims, 4 Drawing Sheets

(56) References Cited

U.S. PATENT DOCUMENTS

| | | | |
|---|---|---|---|
| 2012/0305700 A1 | 12/2012 | Stuart et al. | |
| 2015/0239568 A1 | 8/2015 | Gukeisen | |
| 2015/0354463 A1 | 12/2015 | Suciu et al. | |
| 2015/0377123 A1 | 12/2015 | Adams et al. | |
| 2016/0108807 A1* | 4/2016 | Schwarz | F01D 5/12 60/805 |
| 2016/0195022 A1* | 7/2016 | Schwarz | F02C 7/36 60/772 |
| 2016/0201606 A1 | 7/2016 | Suciu | |
| 2017/0159609 A1 | 6/2017 | Schoenhoff et al. | |

OTHER PUBLICATIONS

European Search Report, issued in EP Application No. 19 16 3380, dated Dec. 2, 2019, pp. 1-5, European Patent Office, Munich, Germany.

Dale Rauch, "Design Study of an Air Pump and Integral Lift Engine ALF-504 Using the Lycoming 502 Core," NASA Report CR-120992, dated Jul. 31, 1972, pp. i-171, published online by NASA Technical Reports Server at URL https://ntrs.nasa.gov/archive/nasa/casi.ntrs.nasa.gov/19730004744.pdf.

D. E. Gray et al., "Energy Efficient Engine Program Technology Benefit/Cost Study vol. II," NASA Report CR-174766, dated Oct. 1983, published online by NASA Technical Reports Server at URL https://ntrs.nasa.gov/search.isp?R=19900019249.

Great Britain search report dated Sep. 24, 2018, issued in GB Patent Application No. 1805764.6.

European Search Report, issued in EP Application No. 19 16 3380, dated Feb. 23, 2021, pp. 6, European Patent Office, Rijswijk, Netherlands.

Philip R. Gliebe et al., "Ultra-High Bypass Engine Aeroacoustic Study", GE Aircraft Engines, NASA/CR-2003-212525, dated Oct. 1, 2003, No. XP055277347, pp. 109, published online by NASA Scientific and Technical (STI) Program Office, Retrieved from the Internet at: URL:http://ntrs.nasa.gov/archive/nasa/casi.ntrs.nasa.gov/20040000741.pdf.

David L. Daggett, "Ultra Efficient Engine Technology Systems Integration and Environmental Assessment", Boeing Commercial Airplane Group, NASA/CR-2002-211754, dated Jul. 1, 2002, No. XP055776982, pp. 56, published online by NASA Scientific and Technical (STI) Program Office, Retrieved from the Internet at: URL:http://ntrs.gov/citations/20020064732/downloads/20020064732.pdf.

J. Bijewitz, et al., "Architectural comparison of advanced Ultra-High Bypass ratio turbofans for medium to long range application", *Deutscher Luft-und Raumfahrtkongress 2014*, Germany, dated Dec. 31, 2014, No. XP055460144, pp. 12, Retrieved from the Internet at: URL:www.dgir.de/publikationen/205340105.pdf.

\* cited by examiner

CASING

CROSS-REFERENCE TO RELATED APPLICATIONS

This application is based upon and claims the benefit of priority from British Patent Application No. GB 1805764.6, filed on 6 Apr. 2018, the entire contents of which are incorporated by reference.

BACKGROUND

Technical Field

The present disclosure relates to a turbofan casing and particularly, but not exclusively, to a turbofan casing for a geared turbofan gas turbine engine.

Description of the Related Art

Aircraft gas turbine engines typically comprise a gas turbine engine core and a core-driven fan enclosed within a fan nacelle. Air flows through the fan in use, and is divided into two airflows downstream, namely a bypass flow and a core flow. The ratio between the mass flow rate of air in the bypass flow to the mass flow rate of airflow of the core flow is known as the bypass ratio. At subsonic flight velocities, a large bypass ratio is desirable for high efficiency.

Gas turbine engine efficiency can also be increased by increasing the Overall Pressure Ratio (OPR). High OPR results in high thermodynamic efficiency, and so low fuel burn. A high OPR can be achieved by increasing the number of compressor stages, and by employing a larger diameter but slower fan driven via a gearbox.

However, high OPR engine cores (having a large number of compressor stages) and/or high bypass ratios can result in a relatively large diameter fan, and a relatively long and thin engine core. Such a core geometry can be susceptible to flexing in flight, which can result in rotor blade tip rubs (potentially resulting in damage) and/or excessive blade tip clearances being required (resulting in an adverse impact on efficiency). Increasing the engine core stiffness by using additional bracing can result in engine weight penalties, which again detracts from the overall aircraft level reduction in fuel consumption provided by high bypass ratios and/or high OPR.

Key load cases which define the powerplant structural architecture are nacelle aerodynamic loads and fan blade-off loads. Such example loads scale with an increase in fan diameter and by-pass ratio.

These increased loads are then required to be reacted by the engine core casing back to the engine mounts and airframe structure. However, with the geared architecture, the core gas path and core engine casing remain at a relatively low diameter, with the resulting slender core casing line subject to high carcass distortion, with associated tip clearance (SFC penalties) and potential shaft and bearing misalignment problems.

SUMMARY

According to a first aspect of the present disclosure there is provided a gas turbine engine comprising, in axial flow sequence:

a fan section, the fan section having a fan that is enclosed by a fan casing; and a compressor section; and a turbine section, the turbine section being operatively connected to the compressor section;

the gas turbine engine further comprising:

a planetary gear train; and a core engine casing, the core engine casing enclosing the compressor section and the turbine section, wherein the gear train has a ratio of greater than approximately 3.0, an input to the gear train being operatively connected to the compressor section, an output from the gear train being operatively connected to the fan, the fan having a diameter F, the core engine casing having a diameter C, the core engine casing diameter C varying along an axial length of the core engine casing, and a ratio $$\left(\frac{C}{F}\right)$$

of the core engine casing diameter C to the fan diameter F being within the range $$0.2 < \left(\frac{C}{F}\right) 0.4,$$

along an axial length of the core engine casing.

The method of the disclosure involves selecting the diameter of the core engine casing C in order to achieve a desired level of stiffness, given a predetermined fan diameter F. The core engine casing diameter C is chosen in order to achieve a predetermined stiffness level, and so to limit the allowable distortion of the core engine casing during normal operation of the engine.

Maintaining a ratio $$\left(\frac{C}{F}\right)$$

of the core engine casing diameter C to the fan diameter F within the range $$0.2 < \left(\frac{C}{F}\right) < 0.4,$$

along an axial length of the core engine casing prevents excessive distortion of the core engine casing during normal operation of the engine.

Optionally, the gas turbine engine further comprises a first engine mount and a second engine mount, the first engine mount being positioned on the fan casing, and the second engine mount being positioned on the core engine casing, wherein a ratio $$\left(\frac{C}{F}\right)$$

of the core engine casing diameter C to the fan diameter F at a plane of the first engine mount is within the range $$0.3 < \left(\frac{C}{F}\right) < 0.4.$$

With the first engine mount being positioned on the fan casing, the bending moment caused by an intake upload during, for example, take-off, rises to a maximum in the plane of the first engine mount.

At the point of maximum bending moment, a ratio $$\left(\frac{C}{F}\right)$$

of the core engine casing diameter C to the fan diameter F within the range $$0.3 < \left(\frac{C}{F}\right) < 0.4,$$

provides further stiffness benefit to thereby prevent unwanted distortion of the core engine casing during normal operation of the engine.

Optionally, the gas turbine engine further comprises a first engine mount and a second engine mount, the first engine mount being positioned on the core engine casing, and the second engine mount being positioned on the core engine casing, the first engine mount being positioned axially proximal to the fan section and the second engine mount being positioned axially distal to the fan section, wherein a ratio $$\left(\frac{C}{F}\right)$$

of the core engine casing ammeter C to the fan diameter F at a plane of the first engine mount is within the range $$0.3 < \left(\frac{C}{F}\right) < 0.4.$$

Optionally, the compressor section has an outlet plane, and a ratio $$\left(\frac{C}{F}\right)$$

of the core engine casing diameter C to the fan diameter F at the outlet plane is within the range $$0.2 < \left(\frac{C}{F}\right) < 0.25.$$

At the outlet plane to the compressor section, the bending moment experienced by the core engine casing is reduced. This enables the a ratio $$\left(\frac{C}{F}\right)$$

of the core engine casing diameter C to the fan diameter F to be selected within the range $$0.2 < \left(\frac{C}{F}\right) < 0.25,$$

during normal operation of the engine.

Optionally, the input to the gear train is directly operatively connected to the compressor section.

Optionally, the input to the gear train is directly operatively connected to the turbine section.

Optionally, the planetary gear train comprises a sun gear, a plurality of planet gears, a ring gear and a carrier.

A planetary gearbox geometry provides a compact arrangement for the speed reduction provided between the core engine and the fan.

Optionally, the ring gear is held stationary.

Optionally, the sun gear is the input to the gear train.

Holding the ring gear stationary and providing an input to the sun gear results in a so-called 'star' drive arrangement for the planetary gearbox.

Optionally, the plurality of planet gears are rotationally mounted on the carrier, and the carrier is operatively connected to the fan.

This provides a space-efficient arrangement for the planetary gearbox.

According to a second aspect of the present disclosure, there is provided a method of sizing a geared turbofan gas turbine core engine casing, the method comprising the steps of:

(i) defining a fan diameter (F) based upon a required engine bypass flow rate;

(ii) defining an elastic modulus (E) based upon the material that is to be used to form the core engine casing;

(iii) defining an acceptable maximum radius of curvature (p) for the core engine casing;

(iii) defining a maximum intake upload experienced by the engine during normal operation;

(iv) calculating a pitch couple (M) from the maximum intake upload and the axial distance from the upload application to the front engine mount;

(v) selecting a value for the core engine casing thickness (t); and (v) calculating a core engine casing diameter (C) from the following equation:

$$C = F \text{ (constant)}$$

where: constant=f (E,p,M,t)

As noted elsewhere herein, the present disclosure may relate to a gas turbine engine. Such a gas turbine engine may comprise an engine core comprising a turbine, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes. The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.37, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the velocity of the fan tip, for example at the leading edge of the tip (which may be defined as fan tip radius at leading edge multiplied by rotational speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limiting example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

A gas turbine engine as described and/or claimed herein may have any desired maximum thrust. Purely by way of non-limiting example, a gas turbine as described and/or claimed herein may be capable of producing a maximum thrust of at least (or on the order of) any of the following: 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (101.3 kPa, 30 deg C.).

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

The skilled person will appreciate that except where mutually exclusive, a feature described in relation to any one of the above aspects may be applied to any other aspect. Furthermore, except where mutually exclusive, any feature described herein may be applied to any aspect and/or combined with any other feature described herein.

DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
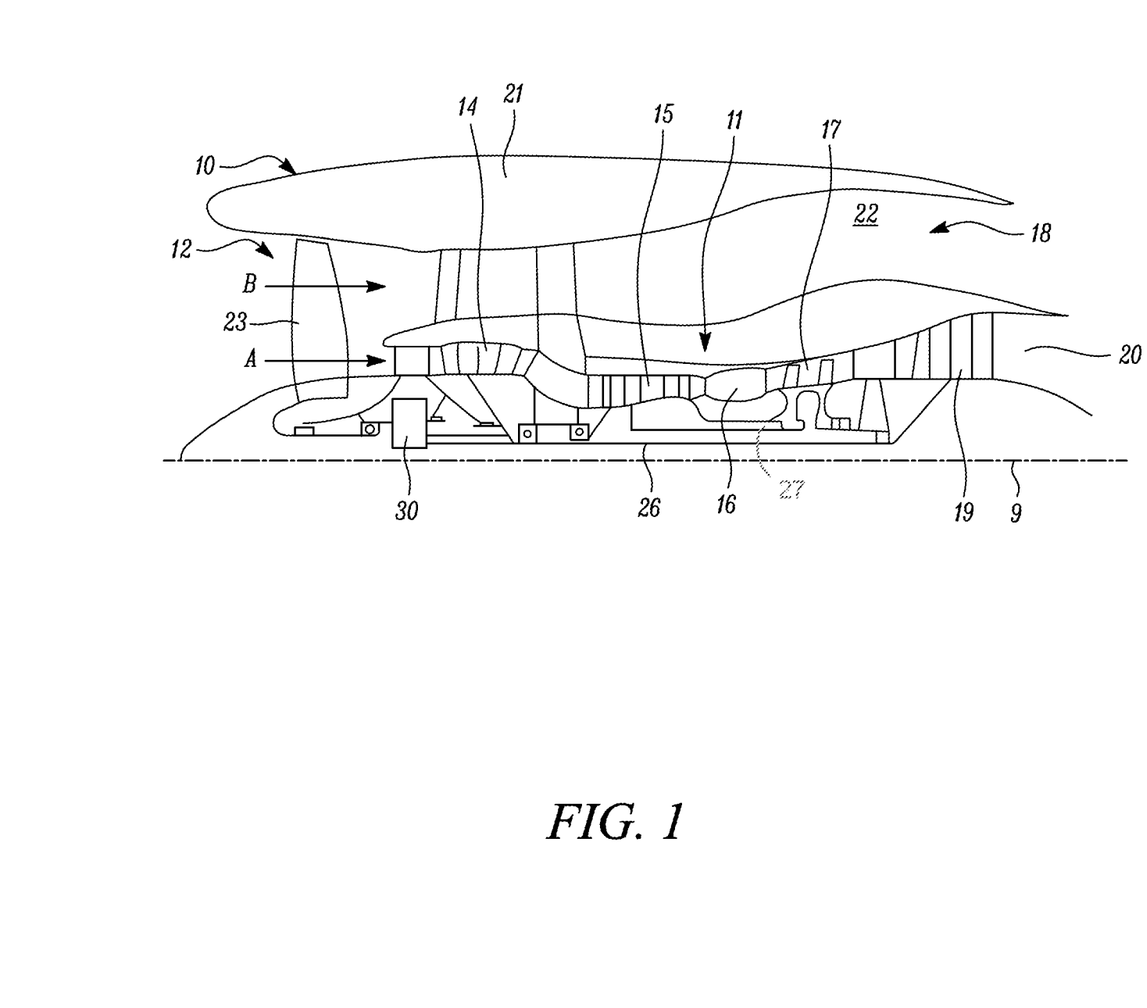
FIG. 1 shows a schematic part-sectional view of a geared turbofan gas turbine engine incorporating an epicyclic geartrain according to an embodiment of the present disclosure.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
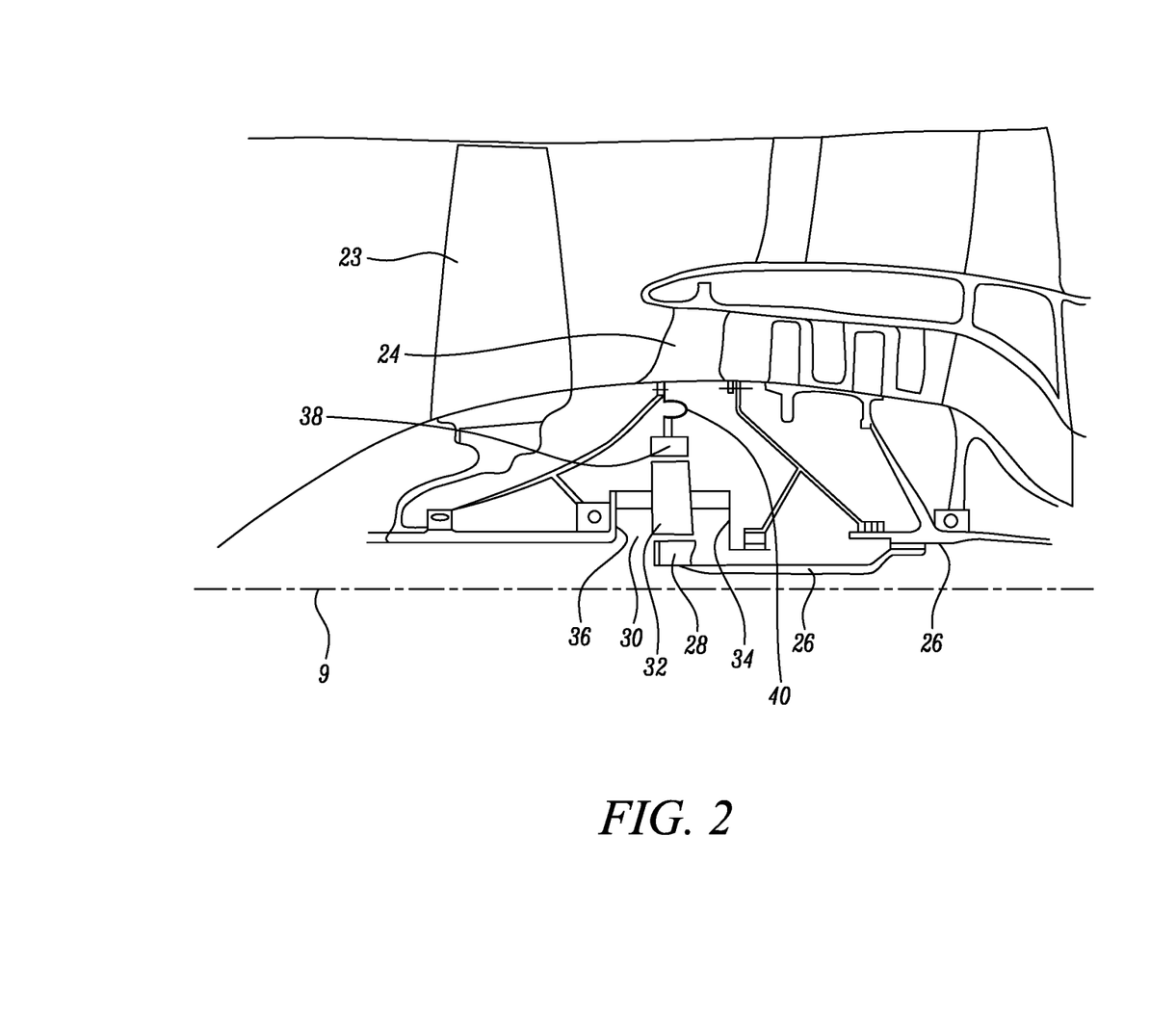
FIG. 2 shows an enlarged schematic view of the gearbox region of the engine of FIG. 1.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Figure 3:
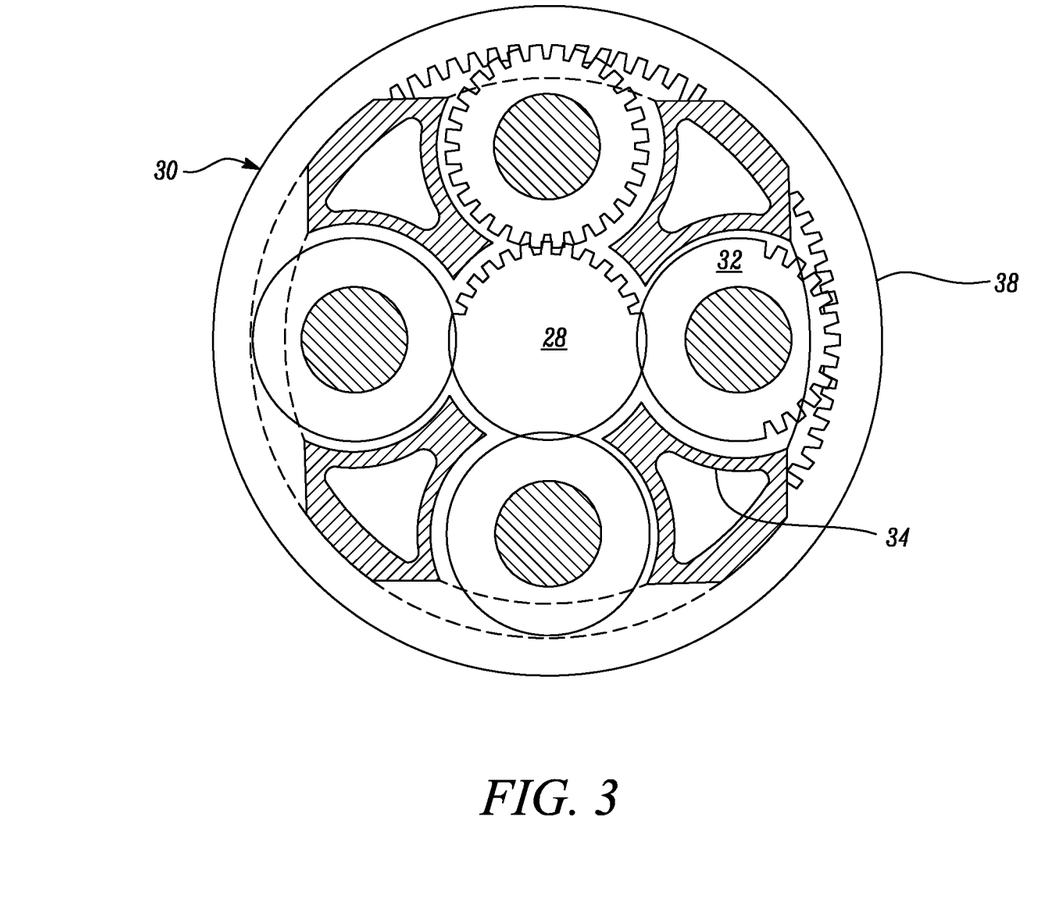
FIG. 3 shows a schematic axial view of the gearbox of the engine of FIG. 1.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor, propeller (aero or hydro), or electrical generator).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
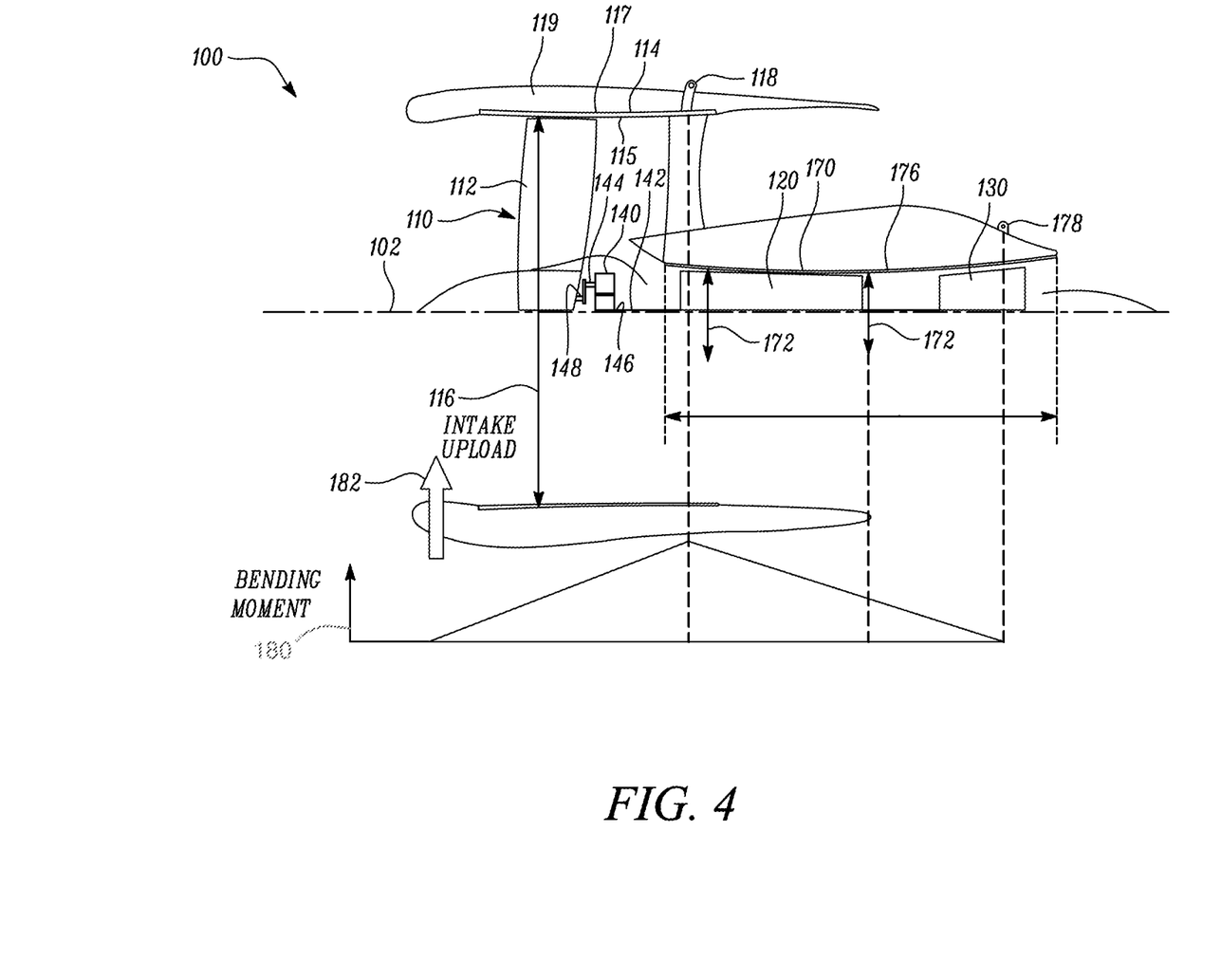
FIG. 4 shows a schematic part-sectional view of the turbofan gas turbine engine of FIG. 1 illustrating the geometrical features of the embodiment.

Referring to FIG. 4, a gas turbine engine according to a first embodiment of the disclosure is designated generally by the reference numeral 100.

The gas turbine engine 100 has an axis of rotation 102. The gas turbine engine 100 comprises, in axial sequence, a fan section 110, a compressor section 120, and a turbine section 130.

The fan section 110 has a fan 112 that is enclosed by a fan casing 114. The fan 112 has a fan diameter 116 represented by the term 'F'. The fan casing 114 is an annular casing. The fan casing 114 has a radially inwardly facing surface 115, and a radially outwardly facing surface 117. The radially inwardly facing surface 115 is swept by the fan 112. The radially outwardly facing surface 117 is itself further enclosed by a nacelle 119. A first engine mount 118 is provided on the radially outwardly facing surface 117 of the fan casing 114.

The compressor section 120 and the turbine section 130 are enclosed a by a core engine casing 170. The core engine casing 170 has a core engine casing diameter 172, represented by the term 'C'. A second engine mount 178 is provided on a radially outwardly facing surface 176 of the core engine casing 170.

The gas turbine engine 100 further comprises a planetary gear train 140. The planetary gearbox 140 has an input 142 and an output 144. The input 142 to the planetary gear train 140 is operatively connected to the compressor section 120 by a shaft 146. The output 144 from the planetary gear train 140 is operatively connected to the fan section 110 by a shaft 148.

One consequence of the reduction in rotational speed of the fan 112 resulting from the geared architecture is that the compressor section 120 and the turbine section 130 may be made smaller in diameter. In other words, the core engine casing diameter 170 is reduced.

As illustrated in FIG. 4, the present disclosure provides a technique for defining a core engine casing profile for a geared turbofan gas turbine engine that will ensure a desired level of core engine casing stiffness. In other words, the method of the present disclosure provides for the selection of a core engine casing diameter 170 that will limit hogging distortion to an acceptable value.

As illustrated in FIG. 4, during normal operation of the turbofan engine 100 such as, in particular, climb manoeuvres, the engine will experience an intake upload 182 at the front (upstream) end of the engine 100. This intake upload 182 being applied at a distance from the plane of the first engine mount will generate a bending moment 180 (illustrated in the lower portion of FIG. 4).

The bending moment 180 rises from zero at the point of application of the intake upload 182 to a maximum value in the plane of the first engine mount 118. The bending moment then decays from a maximum in the plane of the first engine mount 118 to zero in the plane of the second engine mount 178.

Although the first engine mount 118 is shown in FIG. 4 as being positioned on the fan casing 114, in another arrangement, the first engine mount 118 may be situated at the same axial position along the engine but on the core engine casing 170.

The core engine casing 170 can be assumed to behave as a simple beam having a point end load. The radius of curvature of the deflected core engine casing 170 will be a measure of the degree of bending of the core engine casing 170 itself. This radius of curvature can thus be used as a measure of the bending stiffness of the core engine casing.

$$\rho = \frac{EI}{M} \quad (1)$$

where: E=elastic modulus for the core engine casing material;
I=moment of inertia for the cross-sectional profile of the engine casing;
M=applied bending moment.

Assuming that the core engine casing 170 can be approximated by a thin-walled cylinder, we have:

$$I = \pi R^3 t \quad (2)$$

where: I=moment of inertia for the cross-sectional profile of the engine casing;
R=radius of the thin-walled cylinder (core engine casing 170); and
t=wall thickness of the core engine casing.

Further assuming a given acceptable limiting value for the radius of curvature, we have:

$$\frac{E\pi R^3 t}{M} = K_1 \quad (3)$$

where: $K_1$=constant.

Assuming that the values for E, and t are held constant for the core engine casing 170, then:

$$\frac{\pi R^3}{M} = K_2 \quad (4)$$

where: $K_2$=constant.

In the arrangement of FIG. 4, the bending moment, M, 180 is given by the product of the intake upload 182 and the axial distance from the load application to the plane of the first engine mount 118.

For a given intake geometry (i.e. the same L/D ratio; L being the length of the intake, and D being the diameter of the intake), we have that the intake upload scales with the (fan diameter) 2, and the axial distance from the load application to the plane of the first engine mount 118 scales with the fan diameter. In other words:

$$\text{Intake Upload} = K_3 F^2 \quad (5)$$

where: $K_3$=constant; and
F=fan diameter.

$$\text{axial distance from the load application} = K_4 F \quad (6)$$

where: $K_4$=constant; and
F=fan diameter.
This gives:

$$M = K_5 F^3 \quad (7)$$

where: $K_5$=constant.

In other words, the bending moment 180, or intake pitch couple, can be assumed to be proportional to (fan diameter)$^3$.

Substituting equation (7) into equation (4), we have:

$$\frac{\pi R^3}{F^3} = K_6 \quad (8)$$

where: $K_6$=constant.

But the core engine casing diameter C can be expressed as C=2R, which gives:

$$\frac{C^3}{F^3} = K_7 \quad (9)$$

where: $K_7$=constant.

Equation (9) may be further simplified to:

$$\frac{C}{F} = K_8 \quad (10)$$

where: $K_8$=constant.

In other words, for a given material, core engine casing profile, and core engine casing wall thickness, the ratio of core engine casing diameter to fan diameter is structurally architecturally defining.

In one arrangement, the ratio of C/F is 0.33 in the plane of the first engine mount 118. In this arrangement, the ratio of C/F in the exit plane of the compressor section is 0.23.

Various example embodiments of the invention are described herein. Reference is made to these examples in a non-limiting sense. They are provided to illustrate more broadly applicable aspects of the invention. Various changes may be made to the invention described and equivalents may be substituted without departing from the scope of the invention. In addition, many modifications may be made to adapt a particular situation, material, composition of matter, process, process act(s) or step(s) to the objective(s), spirit or scope of the present invention. Further, it will be appreciated by those with skill in the art that each of the individual variations described and illustrated herein has discrete components and features which may be readily separated from or combined with the features of any of the other several embodiments without departing from the scope of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

In addition, where a range of values is provided, it is understood that every intervening value, between the upper and lower limit of that range and any other stated or intervening value in that stated range, is encompassed within the invention.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

The invention claimed is:

1. A gas turbine engine comprising, in axial flow sequence:
   a fan section, the fan section having a fan that is enclosed by a fan casing; and
   a core engine section;
the core engine section comprising:
   a compressor section; and
   a turbine section, the turbine section being operatively connected to the compressor section;
the gas turbine engine further comprising:
   a first engine mount and a second engine mount;
   a planetary gear train; and
   a core engine casing, the core engine casing enclosing the compressor section and the turbine section,
   wherein the gear train has a ratio of greater than approximately 3.0, an input to the gear train being operatively connected to the core engine section, an output from the gear train being operatively connected to the fan,
the fan having a diameter F, the core engine casing having a diameter C, the core engine casing diameter C varying along an axial length of the core engine casing, and a ratio $$\left(\frac{C}{F}\right)$$

of the core engine casing diameter C to the fan diameter F being within the range $$0.2 < \left(\frac{C}{F}\right) < 0.4,$$

along the axial length of the core engine casing,
   wherein the first engine mount is positioned on the fan casing or on the core engine casing, and the second engine mount is positioned on the core engine casing, wherein the first engine mount is positioned axially proximal to the fan section and the second engine mount is positioned axially distal to the fan section, wherein a ratio $$\left(\frac{C}{F}\right)$$

of the core engine casing diameter C to the fan diameter F at a plane of the first engine mount is within the range $$0.3 < \left(\frac{C}{F}\right) < 0.4, \text{ and}$$

wherein the compressor section has an outlet plane, and a ratio $$\left(\frac{C}{F}\right)$$

of the core engine casing diameter C to the fan diameter F at the outlet plane is within the range $$0.2 < \left(\frac{C}{F}\right) < 0.25.$$

2. The gas turbine engine as claimed in claim 1, wherein the first engine mount is positioned on the fan casing.

3. The gas turbine engine as claimed in claim 1, wherein the first engine mount is positioned on the core engine casing.

4. The gas turbine engine as claimed in claim 1, wherein the input to the gear train is directly operatively connected to the compressor section.

5. The gas turbine engine as claimed in claim 1, wherein the input to the gear train is directly operatively connected to the turbine section.

6. The gas turbine engine as claimed in claim 1, wherein the planetary gear train comprises a sun gear, a plurality of planet gears, a ring gear and a carrier.

7. The gas turbine engine as claimed in claim 6, wherein the ring gear is held stationary.

8. The gas turbine engine as claimed in claim 6, wherein the sun gear is the input to the gear train.

9. The gas turbine engine as claimed in claim 6, wherein the plurality of planetary gears are rotationally mounted on the carrier, and the carrier is operatively connected to the fan.

\* \* \* \* \*